US012249904B2

(12) United States Patent
Hara et al.

(10) Patent No.: US 12,249,904 B2
(45) Date of Patent: Mar. 11, 2025

(54) SEMICONDUCTOR MODULE

(71) Applicant: Rohm Co., Ltd., Kyoto (JP)

(72) Inventors: Hideo Hara, Kyoto (JP); Naohiro Imakake, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 104 days.

(21) Appl. No.: 18/026,006

(22) PCT Filed: Sep. 9, 2021

(86) PCT No.: PCT/JP2021/033082
§ 371 (c)(1),
(2) Date: Mar. 13, 2023

(87) PCT Pub. No.: WO2022/075000
PCT Pub. Date: Apr. 14, 2022

(65) Prior Publication Data
US 2023/0369961 A1    Nov. 16, 2023

(30) Foreign Application Priority Data

Oct. 5, 2020   (JP) ................................. 2020-168742

(51) Int. Cl.
*H02M 1/088*   (2006.01)
*H02M 7/537*   (2006.01)
*H02P 27/06*   (2006.01)

(52) U.S. Cl.
CPC .......... *H02M 1/088* (2013.01); *H02M 7/537* (2013.01); *H02P 27/06* (2013.01)

(58) Field of Classification Search
CPC .......... H02M 3/158; H02M 1/08; H02M 1/38; H02M 7/537; H02M 7/5387; H02M 1/088; H02P 27/06
See application file for complete search history.

(56) References Cited

U.S. PATENT DOCUMENTS

2016/0248412 A1*  8/2016  Kadowaki ............... H02M 1/38
2018/0097425 A1*  4/2018  Bader ..................... H02K 11/33

FOREIGN PATENT DOCUMENTS

| JP | 2016082281 | 5/2016 |
| JP | 2016158321 | 9/2016 |
| WO | WO 2021131157 | 7/2021 |

OTHER PUBLICATIONS

International Search Report in International Appln. No. PCT/JP2021/033082, dated Nov. 2, 2021, 5 pages (with English Translation).

* cited by examiner

*Primary Examiner* — Said Bouziane
(74) *Attorney, Agent, or Firm* — Fish & Richardson P.C.

(57) ABSTRACT

A semiconductor module includes a first terminal configured to be fed with a first potential, a second terminal, a third terminal configured to be fed with a second potential lower than the first potential, a first switch connected between the first and second terminals, a second switch connected between the second and third terminals, a first driver configured to turn on and off the first switch, and a second driver configured to turn on and off the second switch. The first driver is configured to set, based on a voltage fed to the second terminal, an inhibition period in which the first switch is inhibited from being turned on.

10 Claims, 5 Drawing Sheets

SEMICONDUCTOR MODULE

CROSS REFERENCE TO RELATED APPLICATIONS

This application is a U.S. National Phase application under 35 U.S.C. § 371 of International Patent Application No. PCT/JP2021/033082, filed on Sep. 9, 2021, which claims the priority of Japanese Patent Application No. JP2020-168742, filed on Oct. 5, 2020, the disclosure of which is incorporated herein by reference in its entirety.

TECHNICAL FIELD

The invention disclosed herein relates to a semiconductor module.

BACKGROUND ART

High-withstand-voltage semiconductor modules such as IPMs (intelligent power modules) include a high-side switch, a low-side switch connected in series with the high-side switch, a high-side driver for driving the high-side switch, and a low-side driver for driving the low-side switch.

The high-side driver drives the high-side switch based on a first control signal fed from outside. The low-side driver drives the low-side switch based on a second control signal fed from outside.

LIST OF CITATIONS

Patent Literature

Patent Document 1: Japanese Patent Application published as No. 2016-82281

SUMMARY OF THE INVENTION

Problem to be Solved by the Invention

If a high-side switch and a low-side switch turn on simultaneously, a through current passes, and this may destroy the high-side and the low-side switches.

In conventional microprocessors that generate a first control signal and a second control signal, to prevent the high-side and low-side switches from being on simultaneously, a dead time period is provided so that in that period the high-side and low-side switches are both kept off.

However, the microprocessors that generate the first and second control signals cannot recognize the states of the high-side and low-side switches and thus set an ample dead time period to accommodate the worst-case estimation of, for example, the difference in state transition delay between the high-side and low-side switches. Since too long a dead time period degrades efficiency, it is preferable to minimize the dead time period.

Means for Solving the Problem

According to one aspect of what is disclosed herein, a semiconductor module includes a first terminal configured to be fed with a first potential, a second terminal, a third terminal configured to be fed with a second potential lower than the first potential, a first switch connected between the first and second terminals, a second switch connected between the second and third terminals, a first driver configured to turn on and off the first switch, and a second driver configured to turn on and off the second switch. The first driver is configured to set, based on the voltage fed to the second terminal, an inhibition period in which the first switch is inhibited from being turned on.

According to another aspect of what is disclosed herein, a power supply device includes an inductor and the semiconductor module of the above configuration of which the second terminal is connected to one end of the inductor.

According to yet another aspect of what is disclosed herein, a motor device includes a motor and the semiconductor module of the above configuration of which the second terminal is connected the motor.

Advantageous Effects of the Invention

The semiconductor module disclosed herein can prevent a through current.

DESCRIPTION OF EMBODIMENTS

In the present description, a MOSFET refers to a field-effect transistor in which the gate is structured to have at least three layers: "a layer of an electrical conductor or of a semiconductor such as polysilicon with a low resistance value", "an insulation layer", and "a P-type, N-type or intrinsic semiconductor layer". That is, the structure of the gate of a MOSFET is not limited to a three-layer structure composed of metal, oxide, and semiconductor layers.

Figure 1:
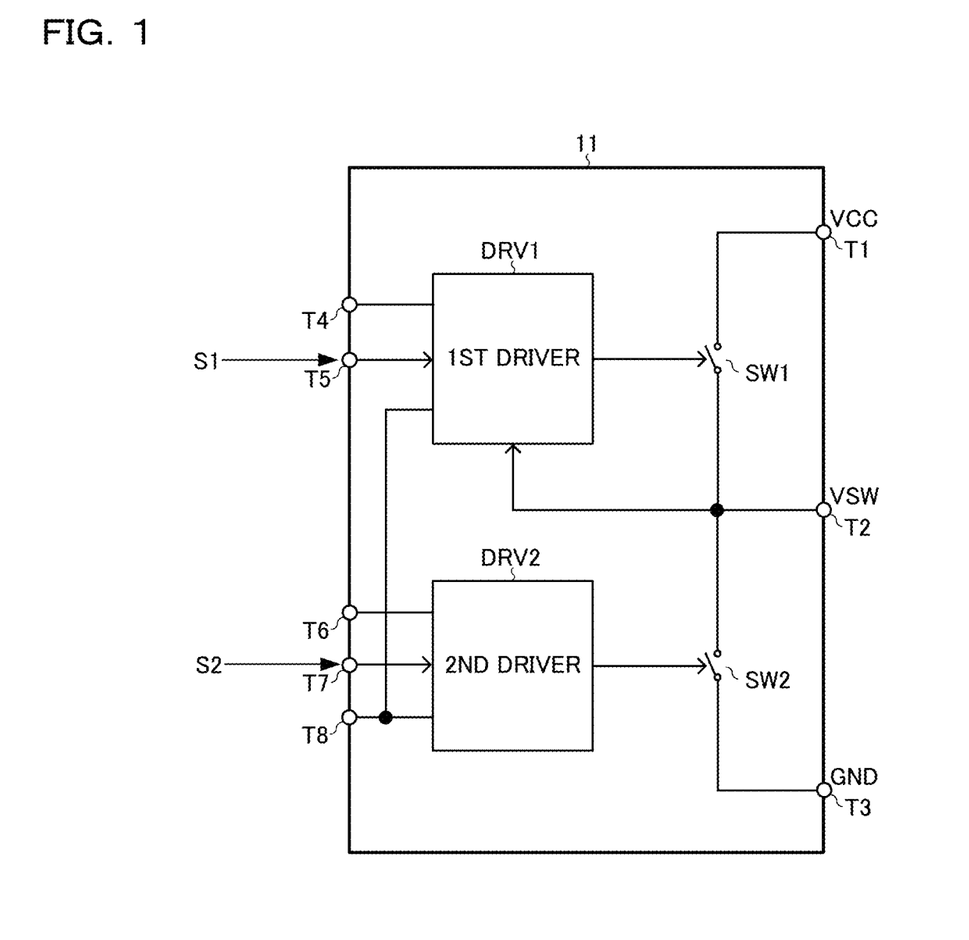
FIG. 1 is a diagram showing a configuration of a semiconductor module according to a first embodiment.

FIG. 1 is a diagram showing a configuration of a semiconductor module 11 according to a first embodiment. The semiconductor module 11 includes a first switch SW1, a second switch SW2, a first driver DRV1, a second driver DRV2, and terminals T1 to T8. The semiconductor module 11 may further include components other than those illustrated in FIG. 1, for example, various protection circuits such as an overvoltage protection circuit and an overheat protection circuit.

A first potential is fed to the terminal T1, and a second potential lower than the first potential is fed to the terminal T3. In this embodiment, the first potential is a supply voltage VCC, and the second potential is a ground potential GND (zero volt voltage).

The first switch SW1 is connected between the terminals T1 and T2. More specifically, one end of the first switch SW1 is connected to the terminal T1, and the other end of the first switch SW1 is connected to the terminal T2. The second switch SW2 is connected between the terminals T2 and T3. More specifically, one end of the second switch SW2 is connected to the terminal T2, and the other end of the second switch SW2 is connected to the terminal T3.

A supply voltage for the first driver is fed to the terminal T4, a supply voltage for the second driver is fed to the terminal T6, and the ground potential (zero volt voltage) is fed to the terminal T8.

The first driver DRV1 is driven by a voltage which is the difference between the supply voltage for the first driver fed to the terminal T4 and the ground potential (zero volt voltage) fed to the terminal T8. The first driver DRV1 controls the first switch SW1 based on a first control signal S1 fed to the terminal T5 from an external microprocessor. The first control signal S1 is a pulse signal.

For example, the first driver DRV1 keeps the first switch SW1 on when the first control signal S1 is at high level and keeps the first switch SW1 off when the first control signal S1 is at low level. However, due to, for example, a parasitic capacitance in the first switch SW1, the time point at which the level of the first control signal S1 changes does not coincide with the time point at which the first switch SW1 turns between on and off.

The first driver DRV1 needs to feed the control terminal of the first switch SW1 with a voltage for turning on the first switch SW1 with reference to the switching voltage VSW fed to the terminal T2. Depending on the value of the supply voltage VCC, the peak value of the switching voltage VSW can be as high as several hundred volts. Accordingly, the first driver DRV1 is manufactured by a high-withstand-voltage process (with a withstand voltage of several hundred volts).

The second driver DRV2 is driven by a voltage which is the difference between the supply voltage for the second driver fed to the terminal T6 and the ground potential GND (zero volt voltage) fed to the terminal T8. The second driver DRV2 controls the second switch SW2 based on a second control signal S2 fed to the terminal T7 from the external microprocessor. The second control signal S2 is a complementary signal of the first control signal S1. Thus, also the second control signal S2, like the first control signal S1, is a pulse signal. The term "complementary" in the present description covers not only operation where the levels of two signals are completely reversed but also operation where a period (dead time) is provided in which the two signals are at such levels as to keep the two switches off simultaneously.

For example, the second driver DRV2 keeps the second switch SW2 on when the second control signal S2 is at high level and keeps the second switch SW2 off when the second control signal S2 is at low level. However, due to, for example, a parasitic capacitance in the second switch SW2, the time point at which the level of the second control signal S2 changes does not coincide with the time point at which the second switch SW2 turns between on and off.

The second driver DRV2 has just to feed the control terminal of the second switch SW2 with a voltage for turning on the second switch SW2 with reference to the ground potential GND (zero volt voltage) fed to the terminal T3. Thus, the second driver DRV2 is manufactured by a general low-withstand-voltage process (with a withstand voltage of several volts to several tens of volts).

The first and second drivers DRV1 and DRV2 are manufactured by different processes; thus it is preferable that they be formed on different IC chips. It is though also possible to form, on a single IC chip, the first driver DRV1 in a high-withstand-voltage process area and the second driver DRV2 in a general low-withstand-voltage process area.

Figure 2:
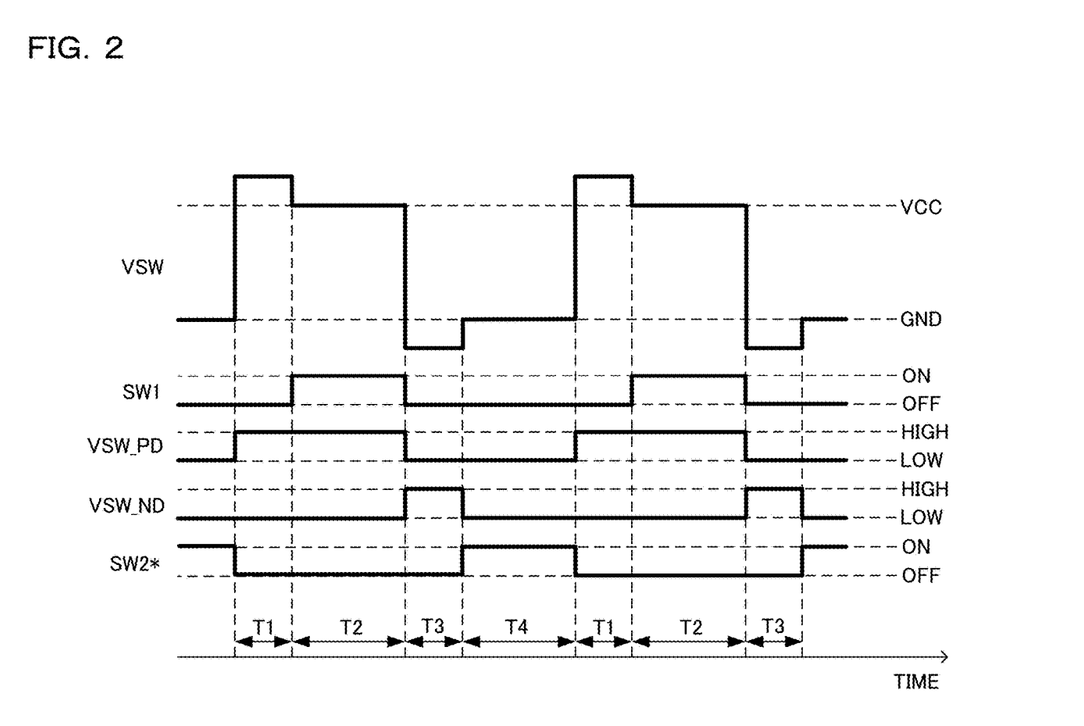
FIG. 2 is a time chart showing a switching voltage etc. in the semiconductor module according to the first embodiment.

FIG. 2 is a time chart showing the switching voltage VSW etc. in the semiconductor module 11 observed with an inductive load connected to the terminal T2.

A transition from a period in which the first switch SW1 is off and the second switch SW2 is on to a period T1 in which the first and second switches SW1 and SW2 are off results in, in the period T1, the switching voltage VSW being higher than the supply voltage VCC.

Next, a transition from the period T1 to a period T2 in which the first switch SW1 is on and the second switch SW2 is off results in, in the period T2, the switching voltage VSW being at a potential equal to or slightly lower than the supply voltage VCC (lower than the supply voltage VCC as much as the voltage drop across the first switch SW1).

Next, a transition from the period T2 to a period T3 in which the first and second switches SW1 and SW2 are off results in, in the period T3, the switching voltage VSW being lower than the ground potential GND.

Next, a transition from the period T3 to a period T4 in which the first switch SW1 is off and the second switch SW2 is on results in, in the period T4, the switching voltage VSW being at a potential equal to or slightly higher than the ground potential GND (higher than the ground potential GND as much as the voltage drop across the second switch SW2).

That is, when the switching voltage VSW is a positive voltage equal to or higher than a predetermined value, the second switch SW2 is off. Here, the predetermined value can be set at a value lower than the supply voltage VCC as much as the voltage drop across the first switch SW1. For example, the predetermined value can be set at a value lower than 90% of the supply voltage VCC. Also when the switching voltage VSW is a negative voltage, the second switch SW is off.

Accordingly, the first driver DRV1 monitors the switching voltage VSW fed to the terminal T2 and sets based on the switching voltage VSW an inhibition period in which the first switch SW1 is inhibited from being turned on. Specifically, the first driver DRV1 sets as the inhibition period the period in which the switching voltage VSW is at a potential equal to or slightly higher than the ground potential GND (higher than the ground potential GND as much as the voltage drop across the second switch SW2).

For example, the first driver DRV1 can include a first comparator which receives, at its non-inverting terminal, the switching voltage VSW and, at its inverting input terminal, a positive voltage equal to or higher than the predetermined value, and a second comparator which receives, at its non-inverting terminal, the switching voltage VSW and, at its inverting input terminal, the ground potential. The inhibition period can be set based on the output signal VSW_PD from the first comparator and the output signal VSW_ND from the second comparator. Specifically, the first driver DRV1 can set as the inhibition period the period in which the output signal VSW_PD from the first comparator and the output signal VSW_ND from the second comparator are both at low level.

In the inhibition period, the first driver DRV1 does not turn on the first switch SW1 regardless of the first control signal S1. That is, in the inhibition period, the first driver DRV1 does not turn on the first switch SW1 even when the first control signal S1 turns to high level.

Setting the inhibition period in the first driver DRV1 makes it possible to prevent a through current resulting from the first and second switches SW1 and SW2 being simultaneously on. That is, a through current can be prevented within the semiconductor module 11, and this eliminates the need to set a long dead time period with respect to the first and second control signals S1 and S2 according to the worst-case estimation of, for example, the difference in state transition delay between the first and second switches SW1 and SW2. It is thus possible to reduce the dead time period.

Figure 3:
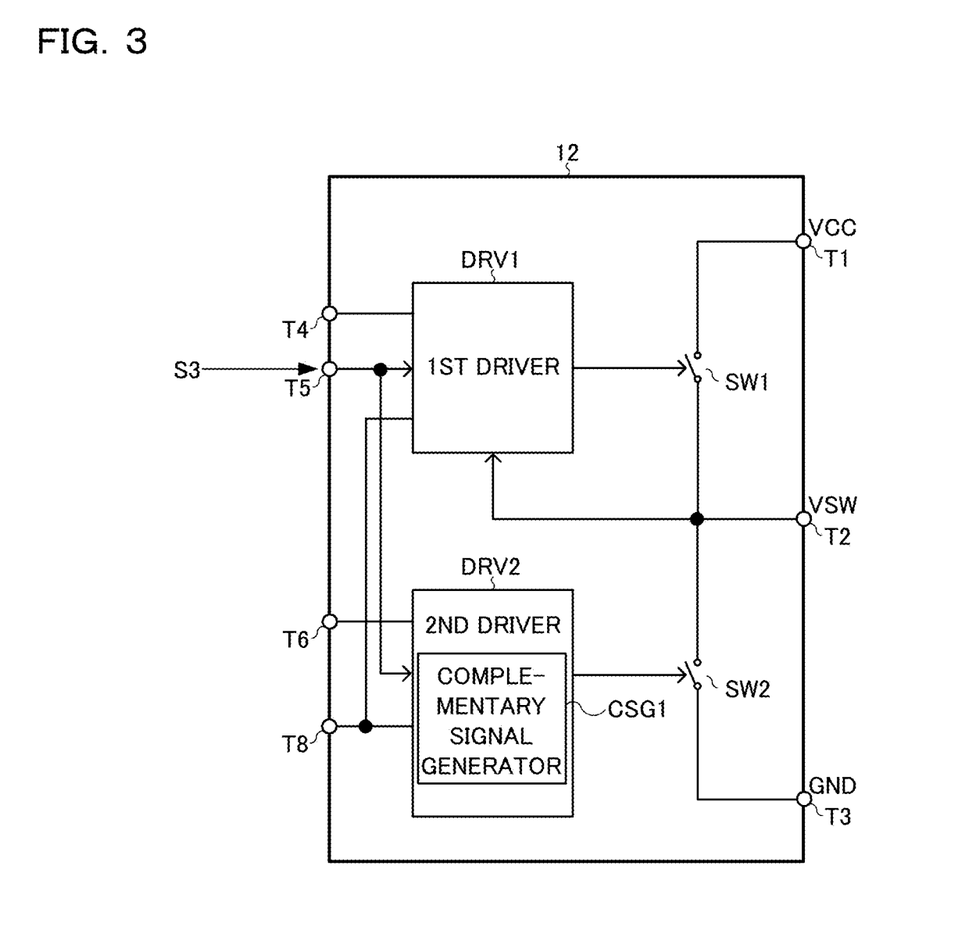
FIG. 3 is a diagram showing a configuration of a semiconductor module according to a second embodiment.

FIG. 3 is a diagram showing a configuration of a semiconductor module 12 according to a second embodiment. The semiconductor module 12 is different from the semiconductor module 11 in that it does not have the terminal T7 and that the second driver DRV2 has a complementary signal generator CSG1. In other respects, it is similar to the semiconductor module 11.

The terminal T5 of the semiconductor module 12 is fed with a control signal S3 from the external microprocessor. The first driver DRV1 controls the first switch SW1 based on the control signal S3 fed to the terminal T5 from the external microprocessor. In the inhibition period, the first driver DRV1 does not turn on the first switch SW1 regardless of the control signal S3.

The complementary signal generator CSG1 generates a complementary signal of (a signal complementary to) the control signal S3. The second driver DRV2 controls the second switch SW2 based on the complementary signal of the control signal S3 generated by the complementary signal generator CSG1.

Setting the inhibition period in the first driver DRV1 makes it possible to prevent a through current resulting from the first and second switches SW1 and SW2 being simultaneously on. That is, a through current can be prevented within the semiconductor module 12, and this eliminates the need to set a long dead time period with respect to the control signal S3 and the complementary signal of the control signal S3 according to the worst-case estimation of, for example, the difference in state transition delay between the first and second switches SW1 and SW2. It is thus possible to reduce the dead time period. The external microprocessor has just to generate a single pulse signal, and this helps reduce the processing load in the external microprocessor and reduce the number of terminals in the semiconductor module 12 compared to that in the semiconductor module 11.

In one modification of this embodiment, the complementary signal generator CSG1 may be provided in the first driver DRV1 instead of in the second driver DRV2. In another modification, the complementary signal generator CSG1 may be provided separately from the first and second drivers DRV1 and DRV2 in the semiconductor module and feed the complementary signal of the control signal S3 generated by the complementary signal generator CSG1 to one of the first and second drivers DRV1 and DRV2.

Next, a description will be given of examples of application of the semiconductor module.

Figure 4:
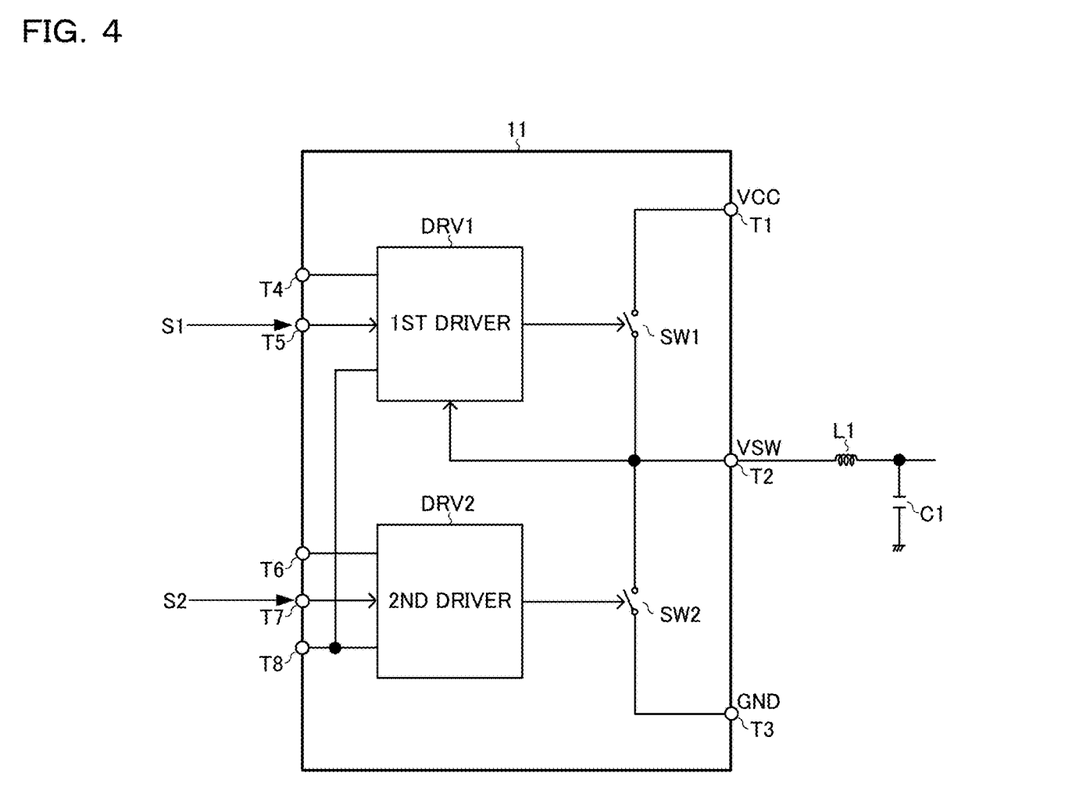
FIG. 4 is a diagram showing a configuration example of a power supply device.

FIG. 4 is a diagram showing a configuration example of a power supply device. The power supply device shown in FIG. 4 includes a semiconductor module 11, an inductor L1, and a capacitor C1. The power supply device shown in FIG. 4 may further include components other than those illustrated in FIG. 4, for example, a voltage divider circuit that divides the output voltage of the power supply device shown in FIG. 4 and a microprocessor that generates the first and second control signals S1 to S2 based on the division voltage output from the voltage divider circuit.

The terminal T2 of the semiconductor module 11 is connected to one end of the inductor L1. The other end of the inductor L1 is connected to one end of the capacitor C1. The other end of the capacitor C1 is connected to the ground potential. The voltage across the capacitor C1 is the output voltage of the power supply device shown in FIG. 4. The power supply device shown in FIG. 4 is a bucking (step-down) switching power supply device.

Instead of the semiconductor module 11 provided in the power supply device shown in FIG. 4, the semiconductor module 12 may be used.

Figure 5:
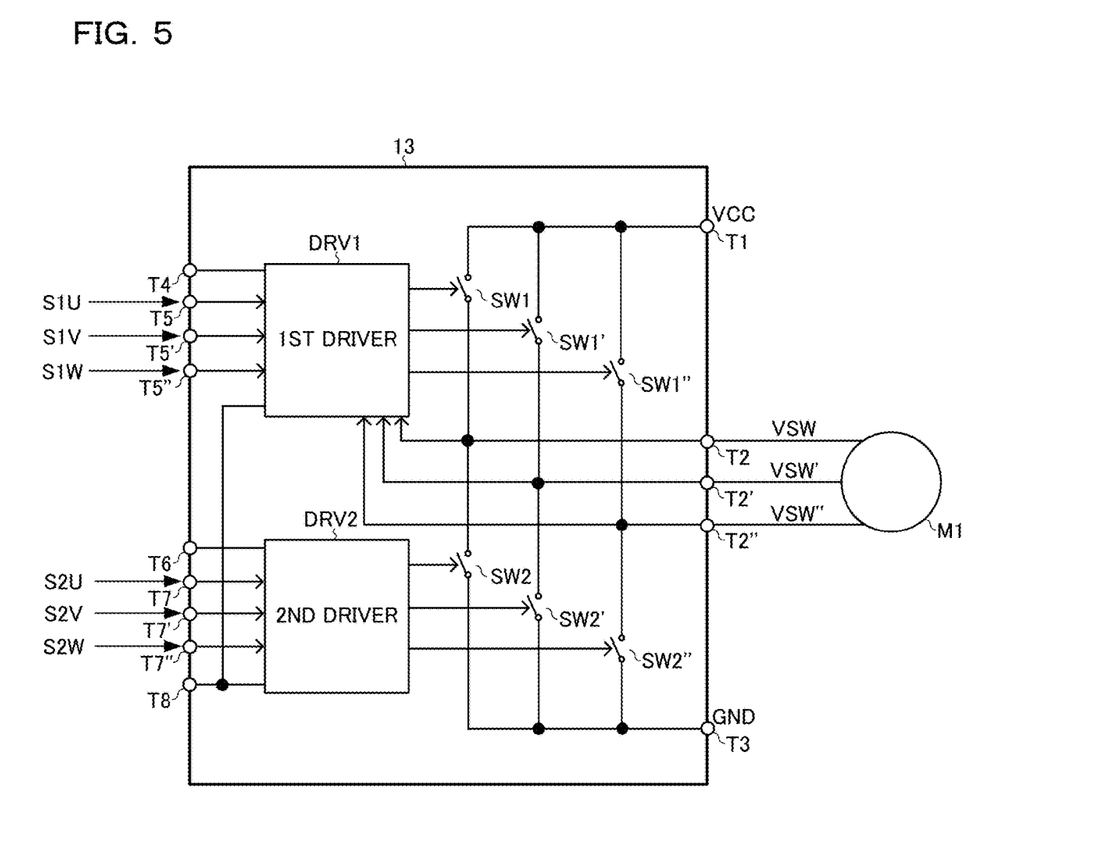
FIG. 5 is a diagram showing a configuration example of a motor device.

FIG. 5 is a diagram showing a configuration example of a motor device. The motor device shown in FIG. 5 includes a semiconductor module 13 and a motor M1. The motor device shown in FIG. 5 may further include components other than those shown in FIG. 5, for example, a position detection sensor that detects the position of the rotor in the motor M1 and a microprocessor that generates, based on the output from the position detection sensor, three first control signals S1U, S1V, and S1W as well as three second control signals S2U, S2V, and S2W.

The semiconductor module 13 is different from the semiconductor module 11 in that it includes three pairs of first and second switches. That is, the semiconductor module 13 includes three first switches SW1, SW1', and SW1" and three second switches SW2, SW2', and SW2".

The semiconductor module 13 further includes a terminal T2' to which the second terminal of the first switch SW1' and the first terminal of the second switch SW2' are connected, and a terminal T2" to which the second terminal of the first switch SW1" and the first terminal of the second switch SW2" are connected.

The semiconductor module 13 further includes a terminal T5' to which the first control signal S1V is fed, a terminal T5" to which the first control signal S1W is fed, a terminal T7' to which the second control signal S2V is fed, and a terminal T7" to which the second control signal S2W is fed. The terminal T5 is fed with the first control signal S1U and the terminal T7 is fed with the second control signal S2U.

The first driver DRV1 controls the first switch SW1 based on the first control signal S1U, controls the first switch SW1' based on the first control signal S1V, and controls the first switch SW1" based on the first control signal S1W. The first driver DRV1 sets the inhibition period with respect to the first switch SW1 based on the switching voltage VSW fed to the terminal T2, sets the inhibition period with respect to the first switch SW1' based on the switching voltage VSW' fed to the terminal T2', and sets the inhibition period with respect to the first switch SW1" based on the switching voltage VSW" fed to the terminal T2".

The second driver DRV2 controls the second switch SW2 based on the second control signal S2U, controls the second switch SW2' based on the second control signal S2V, and controls the second switch SW2" based on the second control signal S2W.

To the terminal T2, one end of the U-phase winding of the motor M1 is connected. To the terminal T2', one end of the V-phase winding of the motor M1 is connected. To the terminal T2", one end of the W-phase winding of the motor M1 is connected. The other ends of the U-phase, V-phase, and W-phase windings of the motor M1 are connected together.

The various technical features disclosed herein can be implemented in any manners other than as described in connection with an embodiment above with various modifications made within the spirit of their technical ingenuity. That is, the embodiments descried above should be understood to be in every aspect illustrative and not restrictive. The technical scope of the present invention is defined not by the description of the embodiments given above but by the appended claims, and should be understood to encompass any modifications made in the sense and scope equivalent to those of the claims.

According to one aspect of what is disclosed herein, a semiconductor module includes a first terminal configured to be fed with a first potential, a second terminal, a third terminal configured to be fed with a second potential lower than the first potential, a first switch connected between the first and second terminals, a second switch connected between the second and third terminals, a first driver configured to turn on and off the first switch, and a second driver configured to turn on and off the second switch. The first driver is configured to set, based on the voltage fed to the second terminal, an inhibition period in which the first switch is inhibited from being turned on (a first configuration).

In the semiconductor module of the first configuration described above, preferably, the first potential is a supply voltage and the second potential is a ground potential (a second configuration).

In the semiconductor module according to the first or second configuration described above, preferably, the first driver is configured not to include in the inhibition period the period in which the voltage fed to the second terminal is a positive voltage equal to or higher than a predetermined value (a third configuration).

In the semiconductor module according to any one of the first to third configurations described above, preferably, the first driver is configured not to include in the inhibition period the period in which the voltage fed to the second terminal is a negative voltage (a fourth configuration).

In the semiconductor module according to any one of the first to fourth configurations described above, preferably, the first driver is configured to control the first switch based on the first control signal, the second driver is configured to control the second switch based on a second control signal which is a complementary signal of the first control signal, and the first driver is configured not to turn on the first switch regardless of the first control signal in the inhibition period (a fifth configuration).

In the semiconductor module according to the fifth configuration described above, preferably, the first and second control signals are fed from outside the semiconductor module (a sixth configuration).

In the semiconductor module according to any one of the first to fourth configurations described above, preferably, the first driver is configured to control the first switch based on a control signal, the second driver is configured to control the second switch based on the control signal, and the first driver is configured not to turn on the first switch regardless of the control signal in the inhibition period (a seventh configuration).

In the semiconductor module according to the seventh configuration described above, preferably, the control signal is fed from outside the semiconductor module (an eighth configuration).

In the semiconductor module according to the seventh or eighth configuration described above, preferably, one of the first and second drivers includes a complementary signal generator configured to generate a complementary signal of the control signal and is configured to perform control based on the complementary signal (a ninth configuration).

According to another aspect of what is disclosed herein, a power supply device described above includes an inductor and the semiconductor module of any one of the first to ninth configurations described above of which the second terminal is connected to one end of the inductor (a tenth configuration).

According to yet another aspect of what is disclosed herein, a motor device described above includes a motor and the semiconductor module of any one of the first to ninth configurations described above of which the second terminal is connected to the motor (an eleventh configuration).

LIST OF REFERENCE SIGNS 11, 12, 13 semiconductor module
C1 capacitor
CSG1 complementary signal generator
DRV1 first driver
DRV2 second driver
L1 inductor
M1 motor
SW1, SW1', SW1" first switch
SW2, SW2', SW2" second switch
T1 to T8, T2', T2", T5', T5", T7', T7" terminal

The invention claimed is:
1. A semiconductor module comprising:
a first terminal configured to be fed with a first potential;
a second terminal;
a third terminal configured to be fed with a second potential lower than the first potential;
a first switch connected between the first and second terminals;
a second switch connected between the second and third terminals;
a first driver configured to turn on and off the first switch; and
a second driver configured to turn on and off the second switch,
wherein
the first driver is configured to set, based on a voltage fed to the second terminal, an inhibition period of time during which the first switch is inhibited from being turned on, and
the first driver is configured not to include, in the inhibition period of time, a period of time in which the voltage fed to the second terminal is a negative voltage.

2. The semiconductor module according to claim 1, wherein
the first potential is a supply voltage and the second potential is a ground potential.

3. The semiconductor module according to claim 1, wherein the first driver is configured not to include in the inhibition period a period in which the voltage fed to the second terminal is a positive voltage equal to or higher than a predetermined value.

4. The semiconductor module according to claim 1, wherein:
the first driver is configured to control the first switch based on the first control signal,
the second driver is configured to control the second switch based on a second control signal which is a complementary signal of the first control signal, and
the first driver is configured not to turn on the first switch regardless of the first control signal in the inhibition period.

5. The semiconductor module according to claim 4, wherein the first and second control signals are fed from outside the semiconductor module.

6. The semiconductor module according to claim 1, wherein:
the first driver is configured to control the first switch based on a control signal,
the second driver is configured to control the second switch based on the control signal, and
the first driver is configured not to turn on the first switch regardless of the control signal in the inhibition period.

7. The semiconductor module according to claim 6, wherein the control signal is fed from outside the semiconductor module.

8. The semiconductor module according to claim 6, wherein one of the first and second drivers includes a complementary signal generator configured to generate a complementary signal of the control signal and is configured to perform control based on the complementary signal.

9. A power supply device comprising:
an inductor; and
the semiconductor module according to claim 1 of which the second terminal is connected to one end of the inductor.

10. A motor device comprising:
a motor; and
the semiconductor module according to claim 1 of which the second terminal is connected to the motor.

* * * * *